United States Patent [19]

Bendahan

[11] Patent Number: 4,498,558

[45] Date of Patent: Feb. 12, 1985

[54] CABLE LUBRICATING DEVICE

[75] Inventor: Samuel H. Bendahan, London, England

[73] Assignee: Dynalube Holdings Limited, Jersey Channel Islands, England

[21] Appl. No.: 443,718

[22] Filed: Nov. 22, 1982

[30] Foreign Application Priority Data

Mar. 2, 1982 [GB] United Kingdom ............... 8206014
Jun. 18, 1982 [GB] United Kingdom ............... 8217767

[51] Int. Cl.³ .............................................. F16N 11/00
[52] U.S. Cl. .................................. 184/15.1; 15/210 B; 277/3
[58] Field of Search ............... 184/15.1, 15.2, 15.3, 184/16; 118/307, 404, 405; 427/434.7; 15/97, 104, 94, 210 B, 256.6; 254/134.3 R, 134.3 FT; 277/53, 54, 55, 56, 57, 58, 59, 3

[56] References Cited

U.S. PATENT DOCUMENTS

| Re. 29,493 | 12/1977 | Crump | 184/15.1 |
|---|---|---|---|
| 737,221 | 8/1903 | Graf et al. | 184/15.1 |
| 1,049,170 | 12/1912 | Thomas | 184/15.1 |
| 1,471,583 | 10/1923 | Andersen | 184/15.1 |
| 1,576,169 | 3/1926 | Timmerman | 184/15.1 |
| 2,207,487 | 7/1940 | Kirkpatrick | 15/210 B |
| 2,251,343 | 6/1944 | Kelley | 15/210 B |
| 2,370,314 | 2/1945 | Jenner | 184/15.1 |
| 2,435,120 | 1/1948 | Baker | 184/15.1 |
| 2,665,773 | 1/1954 | Osmun | 184/15.1 |
| 3,733,216 | 5/1973 | Goldman et al. | 427/434.7 |
| 3,889,781 | 6/1975 | Schott et al. | 184/15.1 |
| 3,951,235 | 4/1976 | Acerbi | 184/15.1 |
| 3,980,110 | 9/1976 | Cain et al. | 184/15.1 |
| 4,169,427 | 10/1979 | Crump et al. | 184/15.1 X |
| 4,248,994 | 2/1981 | Cook | 528/60 |
| 4,336,866 | 6/1982 | Blanton | 184/15.1 |

OTHER PUBLICATIONS

Translation of a Norwegian Patent Application Submitted as Prior Art by Applicant.
Mechanical Drawing Submitted by Applicant as Prior Art.
Two Pictures Marked I and II Submitted by Applicant as Prior Art.

*Primary Examiner*—David H. Brown
*Assistant Examiner*—John E. Griffiths, Jr.
*Attorney, Agent, or Firm*—Howard L. Rose

[57] ABSTRACT

A lubricating device is provided for greasing wire ropes and cables comprising a diametrally split housing with clamps to close the housing about the cable. Within the housing is a diametrally split core body of hard elastomeric material having an axial bore through which the cable travels axially. At the center of the core body is an internal cavity through which the cable passes and which is kept supplied with grease under pressure. Toward its ends the core body has two further internal cavities through which the cable passes, which serve to collect surplus grease. Between and beyond the grease supply and collection cavities, the axial bore of the core body is profiled so that each length of it has the form of an internal triangular section or Vee threaded screw thread; except that the directions of the screw thread are mutually reversed in the two halves of the split core body. The minimum diameter of the screw threads is substantially equal to the cable diameter so that sealing contact occurs between the cable and the thread peaks. At its ends, the housing is fitted with scraper plates having central holes, through which the cable passes, of substantially the same diameter as the cable.

7 Claims, 7 Drawing Figures

CABLE LUBRICATING DEVICE

This invention concerns lubricators for wire ropes or cables.

Lubricators for wire ropes or cables have been proposed comprising a split cyclindrical shell the two parts of which are closed together around the cable, a centre chamber inside the shell through which the cable passes and which is kept filled with grease under pressure, seals beyond either end of the central grease chamber through which the cable enters and leaves the grease chamber, and further chambers beyond the seals to receive any surplus grease, the central chamber having connection to a supply of grease under pressure and the further chambers communicating with a grease return line. However, the previous lubricating devices of this kind have encountered certain problems, especially regarding the sealing of the grease chamber. It is therefore an object of this invention to provide an improved lubricating device of this kind, and, in particular, an improved seal assembly.

According to the present invention, each seal or seal section through which the cable passes is moulded from comparatively hard elastomeric material and has an internal profile, contacting the cable, that consists of two portions on either side of a central dividing axial plane said portions being substantially in the form of two matching halves of a triangular-section screw thread but with the thread directions of the two portions mutually reversed. By this means, efficient greasing of the wire rope is achieved and the lubricator device is effectively sealed against the escape of grease, while the durability of the seals is increased and the friction as the cable passes through the lubricator is kept to a reasonably low level.

One arrangement according to the invention will now be described by way of example, with reference to the accompanying drawings in which.

Figure 1:
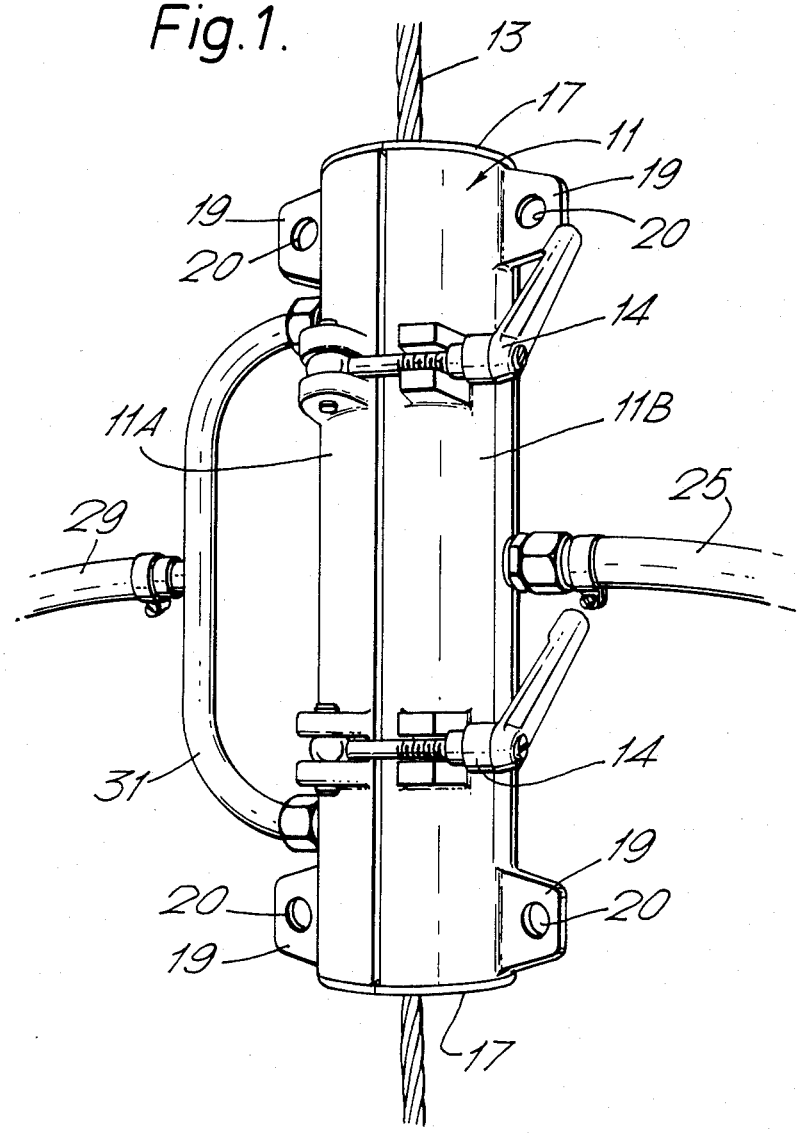
FIG. 1 shows the lubricating device in external elevation.
Figure 2:
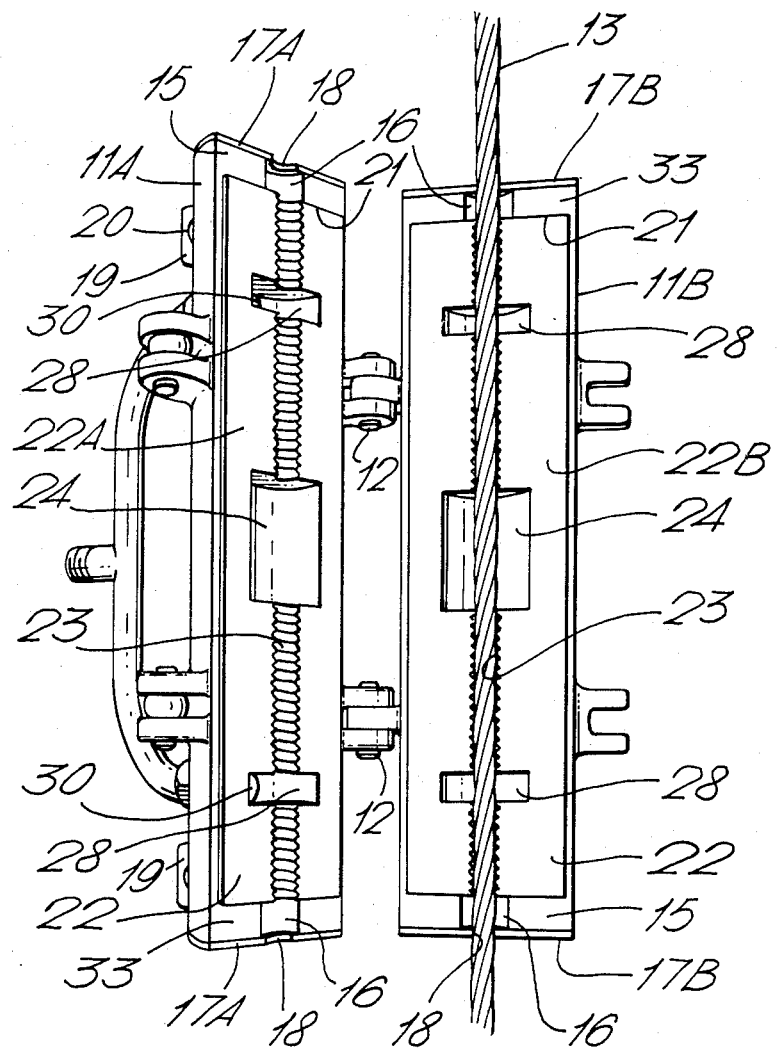
FIG. 2 is an elevational view showing the device open.
Figure 3:
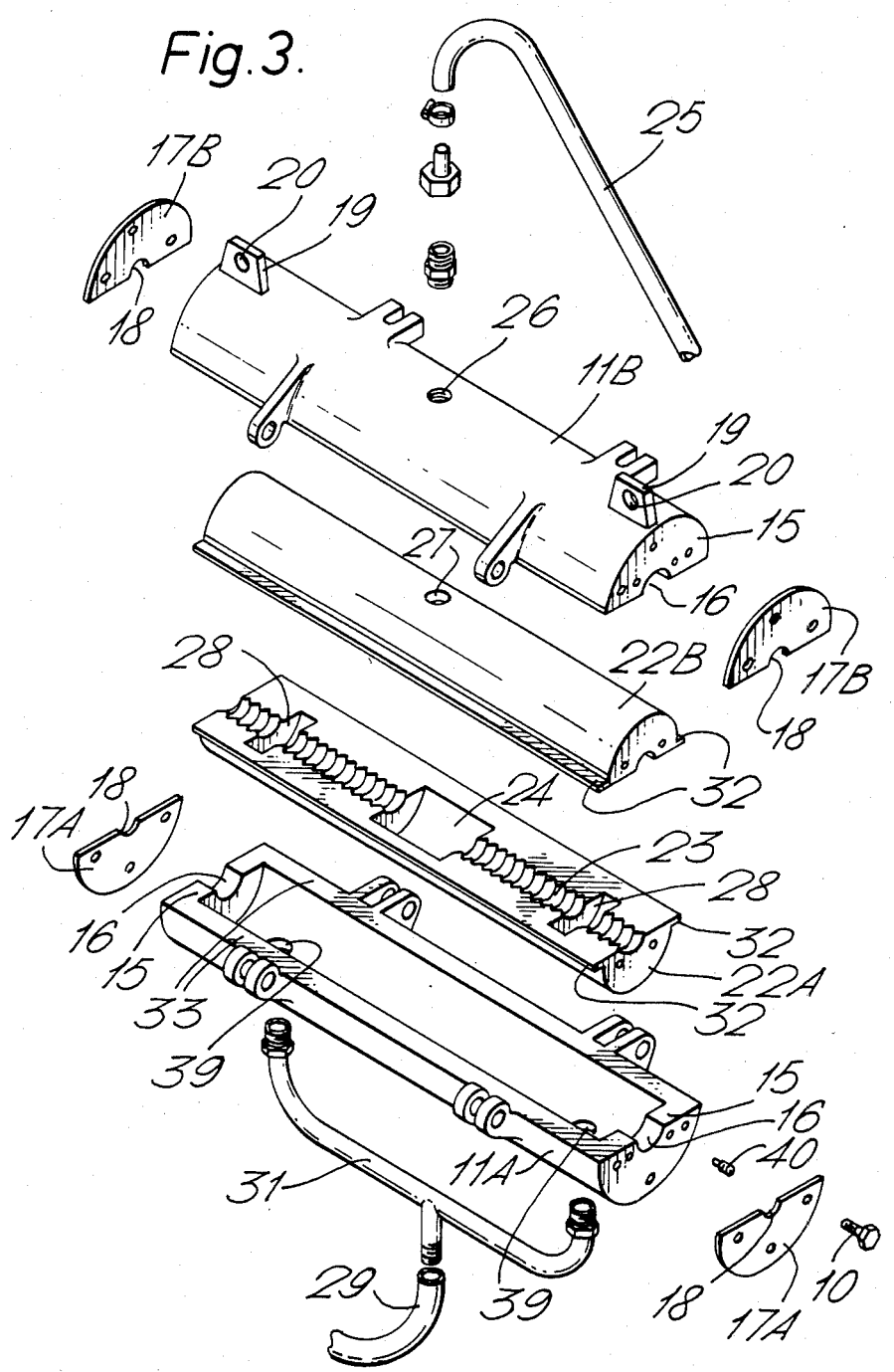
FIG. 3 is an exploded view.
Figure 4:
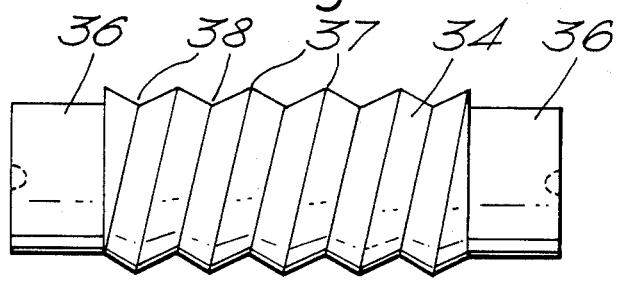
Figure 5:
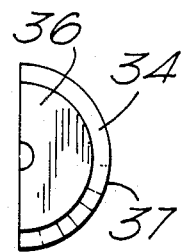
Figure 6:
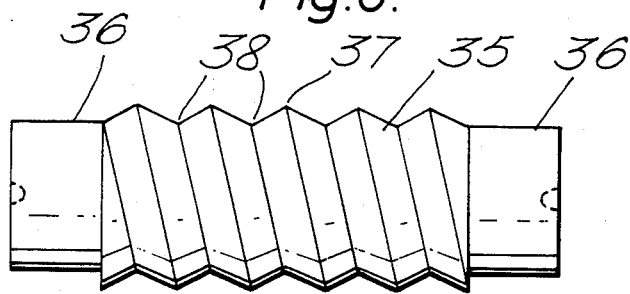
Figure 7:
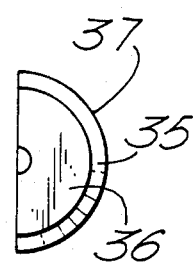

FIGS. 4 and 5 are, respectively, a side and end elevation of one segment of a split mould insert for use in moulding a seal section of an elastomeric core body within the lubricating device, and FIGS. 6 and 7 are, respectively, corresponding side and end elevations of the other split mould insert segment that matches with the segment of FIGS. 4 and 5.

The lubricating device comprises a shell or housing 11 of generally cylindrical form with closed ends, this housing being split into two halves 11A, 11B on a diametric axial plane with the two halves hinged to one another, as at 12, so that the unit can be opened to enable it to be fitted on to and removed from a cable 13 to be treated. Robust external screw clamps 14 are provided to clamp the housing in the closed position. The housing ends 15 have central holes 16 of large enough diameter to enable the cable to pass freely through, and stainless steel scraper plates 17 are bolted externally on to the housing ends 15 by means of bolts 10, these scraper plates having central holes 18 of smaller diameter than the housing ends so that the cable is a close running fit through the scraper plates 17. The purpose of these scraper plates is to remove debris from the cable and lay down any broken cable strands prior to entry of the cable into the unit. As in the case of the housing itself, each scraper plate 17 is split into two halves 17A, 17B diametrically to permit opening of the unit. At each end, the housing bears externally a pair of lugs 19 with eyes 20 to receive anchor chains that restrain the unit against the frictional pull of the cable 13 as the cable passes through during lubrication.

Internally, the housing is formed with a long cylindrical cavity 21, of considerably greater diameter than the end holes, within which cavity an internal core unit 22 of hard elastomeric material is a snug fit. The core unit 22 has a bore 23 extending through it axially from end to end through which the cable 13 passes, this bore having the special internal profile described herein so that it can contact the cable without significant friction. Halfway along the core unit 22 it has an internal central grease supply chamber 24 of considerably larger diameter than and intersected by the bore 23, to which grease is supplied under pressure from an external high pressure grease line 25 through a hole 26 in the housing wall and a mating hole 27 in the core body giving access to the central chamber 24. the grease chamber 24 contains a substantial quantity of grease, having a diameter several times that of the wire rope and an axial length rather greater than its diameter. Toward the ends of the core unit it has two internal grease collection chambers 28, also of larger diameter than and intersected by the axial bore 23 through which the cable passes, and these grease collection chambers communicate with a grease return line 29 by way of holes 30 in the core unit, and mating holes 39 in the housing wall, and an external manifold 31. The grease collection chambers 28 have the same diameter as the central grease chamber 24 but are comparatively short in the axial direction.

It is noted that the central chamber 24 and the collection chambers 28 constitute three axially spaced internal cavities between and beyond which are four axially spaced threaded sections of core unit 22 that are profiled to contact the cable 13 and act as grease seals.

As in the case of the housing and the scraper plates, the internal core unit 22 is split into two halves 22A, 22B on the same diametral axial plane as the housing, and each half of the core unit has a pair of longitudinal flanges 32 extending out radially beyond the external diameter of the main body of the core unit, and therefore also beyond the diameter of the cylindrical cavity 21 in the housing into which the core unit 22 fits, so that when the housing is closed these flanges 32 are clamped tightly between the diametral faces 33 of the housing halves 11A, 11B that lie radially outward of said cavity. The halves of the core unit 22 are held in place in the housing halves 11A, 11B by means of screws 40 passing through holes in the housing ends 15.

FIGS. 4 to 7 show two matching segments 34, 35 of a mould insert for use in moulding a seal section of the core unit 22. Each half of the core unit 22 within the shell or housing 11 of the lubricating device is formed as one tough unitary polyurethane moulding, and to mould both halves of the core unit four pairs of the mould insert segments 34, 35 substantially as shown are employed, together with further mould inserts for forming the chambers 24, 28. That is to say, the complete mould insert for the whole core unit comprises, in axial sequence, a first pair of mould insert segments 34, 35, a first larger diameter collar (not shown) to form one grease collection chamber 28, a second pair of segments 34, 35, a second collar (not shown), longer than the first, to form a central grease chamber 24, a third pair of segments 34, 35, a third collar (not shown) the same size as the first to form the other grease collection chamber 28, and a final fourth pair of segments 34, 35.

As shown in the drawings, each mould insert segment 34 or 35 is basically semi-cylindrical with plain ends 36, the portion between the plain ends bearing half of a triangular-section screw thread 37. The screw threads 37 on the two matching segments 34, 35 are reversed, i.e. one is left-handed and the other is right-handed, but otherwise they are the same. When the mould insert is assembled the collars for forming the grease supply and collection chambers fit on to the plain ends 36 of the segments 34, 35. The thread angle and pitch of the triangular threads will be selected approximately for the size of core unit; core units of different internal sizes are required for ropes or cables of different diameters. The smallest diameter of the threads 37 on the segments 34, 35, i.e. the diameter at the thread valleys 38, is chosen to match the diameter of the wire rope or cable. In the example shown, the Vee angle of the triangular or Vee-threads 37 of the single start screw thread is substantially 120°, and the depth of the thread teeth is about ⅛ of the diameter of the cable. The purpose of the thread reversal as between one segment 34 or 35 and its mate is to prevent the internal threads of the core unit 22 from inducing a net flow of grease in the axial direction within the core unit as a rope or cable passes through when the lubricating device is in use.

As regards the outermost pairs of mould insert segments 34, 35, the outer end plain portions 36 can be omitted, if desired, since no collar fit on them; or alternatively, the plain ends can be left projecting beyond the ends of the moulding.

A suitable polyurethane for the core unit 22 will have the following properties:

Ultimate Tensile Strength: 4,500 lbs/in$^2$
100% Modulus Elongation: 1,100 lbs/in$^2$
300% Modulus Elongation: 2,100 lbs/in$^2$
Elongation at break: 450%

For entry of grease under pressure to the greasing chamber 24, a single radial hole 27 is moulded in one half 22B of the polyurethane core body 22, and likewise single radial holes 30 are moulded in the other half core body 22A for the exit of grease from the two collection chambers 28.

I claim:

1. A cable lubricating device for greasing wire ropes and cables comprising:
   a cylindrical housing formed of two generally semi-cylindrical half-housings that fit together at a diametrical axial plane of the housing,
   said two half-housings being designed and arranged to fit together around a wire cable, the cable travelling axially through said housing,
   clamps for clamping said two half-housings together,
   a center grease-application chamber within the housing having a larger diameter than the cable,
   said cable passing through the center grease-application chamber,
   a grease supply line connected to said center grease-application chamber,
   a first and a second seal in the housing in axial alignment with said center grease-application chamber, said first and said second seals defining opposite ends of said center grease-application chamber,
   said cable passing through said seals when the cable enters and leaves said center chamber, and
   two further chambers in the housing located axially outward of said first and second seals to collect surplus grease escaping through the seals, said seals defining inner ends of said further chambers,
   a grease return line communicating with said further grease-collecting chambers,
   wherein each said seal is moulded of elastomeric material with an internal profile contacting the cable and consists of two seal portions, one of said portions on each side of said diametrical, axial plane,
   said two seal portions being substantially in the form of two matching halves, said halves comprising an internal triangular section thread with thread peaks and valleys, the thread directions of the two seal portions being mutually reversed from one another,
   the diameter of the thread valleys being greater than the maximum diameter of the cable,
   the diameter of the thread peaks being substantially equal to the maximum diameter of the cable whereby the threads of said seals contact the cable at the peaks of the threads only.

2. A cable lubricating device for greasing wire ropes and cables comprising:
   a cylindrical housing formed of two generally semi-cylindrical half-housings that fit together at a diametrical axial plane of the housing,
   said two half-housings being designed and arranged to fit together around a wire cable, the cable travelling axially through said housing,
   clamps for clamping said two half-housings together,
   a center grease-application chamber within the housing having a larger diameter than the cable,
   said cable passing through said center grease-application chamber,
   a grease supply line connected to said center grease-application chamber,
   a first and a second seal in the housing in axial alignment with said center grease-application chamber, said first and said second seals defining opposite ends of said center grease-application chamber, said cable passing through the seals when the cable enters and leaves the center chamber,
   two further chambers in the housing located axially outward of said seals to collect surplus grease escaping through the seals, said seals defining inner sides of said further chambers,
   a grease return line communicating with said further grease-collecting chambers, and
   diametrically split scraper plates secured to the housing at positions axially outward of said grease-collecting chambers, said scraper plates having center holes through which the cable passes,
   said center holes being of substantially the same diameter as the cable,
   wherein each said seal is moulded of elastomeric material with an internal profile contacting the cable and consists of two seal portions, one of said portions on each side of said diametrical axial plane,
   said two seal portions being substantially in the form of two matching halves, said halves comprising an internal triangular section thread with thread peaks and valleys, the thread directions of the two seal portions being mutually reversed from one another,
   the diameter of the thread valleys being greater than the maximum diameter of the cable, the diameter of the thread peaks substantially equal to the maximum diameter of the cable whereby the threads of said seals contact the cable at the peaks of the threads only.

3. A cable lubricating device for applying grease under pressure to wire ropes and cables comprising:

two matching generally semi-cylindrical half-housings that fit together to form a complete cylindrical housing, said housing complete having opposite axial ends and an axial through passage through which a rope or cable to be treated passes;

clamp means for clamping said two matching half-housings to one another, means defining a centrally-disposed grease supply chamber, said defining means also defining two grease-collection chambers disposed axially outward of said grease supply chamber, one of said grease-collection chambers being located at each end of said grease supply chamber, said defining means being fixedly retained within said housing, said chambers being coaxial with said complete housing, said cable passing through all three of said chambers, all three of said chambers being of larger diameter than the cable, a grease supply line in communication with said central grease supply chamber, and a grease return line in communication with said two grease-collection chambers, said defining means defining a grease seal between each said grease-collection chamber and said centrally-disposed grease supply chamber, wherein each said seal is moulded of elastomeric material with an internal profile contacting the cable and consists of two seal portions, one on each side of a diametrical axial plane, said two seal portions being substantially in the form of two matching halves, said halves comprising an internal Vee section thread with thread peaks and valleys, the thread directions of said two portions being mutually reversed from one another, the diameter of the thread valleys being greater than the maximum diameter of the cable, the diameter of the thread peaks being substantially equal to the maximum diameter of the cable whereby said seal profile contacts the cable only at the peaks of the Vee-thread.

4. A lubricating device according to claim 3, wherein said complete housing is formed with a large axial internal cylindrical cavity, said defining means comprising a diametrically split but otherwise unitary elastomeric core body fitted within said cavity, and wherein said core body defines said three axially spaced internal chambers and said grease seals.

5. A lubricating device according to claim 4, wherein said core body is moulded of polyurethane having an ultimate tensile strength of approximately 4,500 lbs/in$^2$, a 100% modulus of elongation of approximately 1,100 lbs/in$^2$, a 300% modulus of elongation of approximately 2,100 lbs/in$^2$ and an elongation at break of approximately 450%.

6. A lubricating device according to claim 4, wherein said half-housings have diametrically-opposed faces, said core body having pairs of longitudinal flanges extending radially outward, said flanges being clamped between the diametrically-opposed faces of said two half-housings.

7. A lubricated device according to claim 5, wherein said half-housings have diametrally-opposed faces, said core body having pairs of longitudinal flanges extending radially outward, said flanges being clamped between the diametrical faces of said half-housings.

* * * * *